(12) United States Patent
Endo et al.

(10) Patent No.: US 9,654,588 B2
(45) Date of Patent: May 16, 2017

(54) DEVICE CONTROL APPARATUS, CLIENT APPARATUS, DEVICE CONTROL METHOD, AND DEVICE CONTROL SYSTEM

(75) Inventors: Ryo Endo, Niigata (JP); Ryosuke Miyashita, Niigata (JP); Satoshi Negishi, Niigata (JP)

(73) Assignee: Canon Imaging Systems Inc., Niigata-shi (JP)

( * ) Notice: Subject to any disclaimer, the term of this patent is extended or adjusted under 35 U.S.C. 154(b) by 168 days.

(21) Appl. No.: 13/505,537

(22) PCT Filed: Nov. 2, 2010

(86) PCT No.: PCT/JP2010/069871
§ 371 (c)(1),
(2), (4) Date: May 2, 2012

(87) PCT Pub. No.: WO2011/055831
PCT Pub. Date: May 12, 2011

(65) Prior Publication Data
US 2012/0221736 A1    Aug. 30, 2012

(30) Foreign Application Priority Data
Nov. 4, 2009    (JP) .................................. 2009-253395

(51) Int. Cl.
*H04L 29/04*    (2006.01)
*H04L 29/08*    (2006.01)
(Continued)

(52) U.S. Cl.
CPC ........ *H04L 67/303* (2013.01); *H04L 61/2038* (2013.01); *H04L 67/306* (2013.01); *G06Q 30/04* (2013.01); *H04L 12/56* (2013.01)

(58) Field of Classification Search
CPC ....... H04L 63/08; H04L 63/10; H04L 67/303; H04L 67/306; H04L 51/38
(Continued)

(56) References Cited

U.S. PATENT DOCUMENTS

2002/0083143 A1    6/2002  Cheng
2009/0070458 A1*   3/2009  Fuse ...................... H04L 12/56
                                                        709/224
(Continued)

FOREIGN PATENT DOCUMENTS

CN    1428034 A        7/2003
JP    2003-032381 A    1/2003
(Continued)

OTHER PUBLICATIONS

Chinese OA dated Feb. 27, 2014 issued in counterpart CN appl No. 201080050211.6. English translation provided.
(Continued)

*Primary Examiner* — Barbara Burgess
(74) *Attorney, Agent, or Firm* — Rossi, Kimms & McDowell LLP

(57) ABSTRACT

There is provided a device control apparatus which makes it possible to dispense with device monitoring (polling) by a client apparatus to thereby reduce traffic on a network. A device server 200 acquires, according to device information for identifying a device locally connected to the device server 200, at least one of a trigger detection algorithm and a definition file for monitoring a state change of the device identified based on the device information, and monitors the locally connected device based on at least one of the acquired trigger detection algorithm and definition file. Then, when a state change of the device is detected, the device server 200 sends a trigger notification indicative of the detection of the state change to a client PC 100 via a
(Continued)

network 500, and starts a session with the client PC 100 in response to a connection request from the client PC 100 having received the trigger notification.

17 Claims, 13 Drawing Sheets

(51) Int. Cl.
*H04L 29/12* (2006.01)
*G06Q 30/04* (2012.01)
*H04L 12/54* (2013.01)

(58) Field of Classification Search
USPC .............. 709/203, 217, 223, 224, 227, 228
See application file for complete search history.

(56) References Cited

U.S. PATENT DOCUMENTS

2010/0071053 A1* 3/2010 Ansari .................. G06Q 30/04
726/12

2010/0217837 A1* 8/2010 Ansari .................. G06Q 30/04
709/218

FOREIGN PATENT DOCUMENTS

| JP | 2004516711 A | 6/2004 |
| JP | 2007-317067 A | 12/2007 |
| WO | 02/49276 A2 | 6/2002 |
| WO | 0249276 A2 | 6/2002 |

OTHER PUBLICATIONS

Japanese Office Action cited in Japanese counterpart application No. JP2011539420, dated Oct. 21, 2014.

Chinese Office Action cited in Chinese counterpart application No. CN201080050211.6, dated Nov. 4, 2014.

Chinese Office Action issued in Chinese counterpart application No. CN201080050211.6, dated Jun. 30, 2015. English translation provided.

* cited by examiner

FIG.6

| | |
|---|---|
| SIGNATURE DATA | ~610 |
| ELECTRONIC MESSAGE SIZE | ~620 |
| COMMAND ID | ~630 |
| VENDOR ID | ~640 |
| PRODUCT ID | ~650 |
| SERIAL NUMBER | ~660 |
| DEFINITION FILE | ~115 |
| TRIGGER DETECTION ALGORITHM | ~116 |

DEVICE CONTROL APPARATUS, CLIENT APPARATUS, DEVICE CONTROL METHOD, AND DEVICE CONTROL SYSTEM

This application is a U. S. National Phase Application of PCT International Application PCT/JP2010/069871 filed on Nov. 2, 2010 which is based on and claims priority from JP 2009-253395 filed on Nov. 4, 2009 the contents of which is incorporated herein in its entirety by reference.

TECHNICAL FIELD

The present invention relates to a device control apparatus, a client apparatus, a device control method, and a device control system, and more particularly to a device control apparatus equipped with a function for controlling devices via a network, a client apparatus, a device control method, and a device control system.

BACKGROUND ART

With the widespread use of networks, there has been disclosed a device server configured to enable a device (peripheral device), which has conventionally been used by local connection e.g. to a personal computer (PC), to be used by a client PC on a network.

For example, there have been proposed some methods for enabling a client PC on a network to use a device, such as a printer, a storage, or a scanner, as a shared device via a device server.

As one of the methods, a method has been proposed in which dedicated application software (hereinafter referred to as "the utility") is preloaded in a client PC, and in the case of accessing a device, a user operates the preloaded utility, thereby causing the client PC to virtually recognize the device to be accessed, as a locally connected device, so that the user can access the device as if it is a locally connected device, from the client PC on a network.

In this method, which requires session (connection) start and end operations by a user, the session with a device server is occupied until the user executes a device termination operation using the utility, which disables use of the device by another client PC.

To solve the above-mentioned problem, there has been disclosed a network file management system in which a device server permits a specific client PC to perform data transmission with a device, as a data transmission occupation state, only for a time period during which block data having a data length specified by a block header is transmitted (see e.g. Japanese Patent Laid-Open Publication No. 2007-317067).

SUMMARY OF INVENTION

Technical Problem

Certainly, the network file management system disclosed in Patent Literature 1 makes it possible for a plurality of client PCs to share a device without execution of manual operation on the client PCs.

However, in a case where a device is connected which very frequently necessitates the state of occupation by a client PC, it is difficult for the client PC to use another device simultaneously due to a technical restriction that in a state where a client PC occupies one device connected thereto via a network, the client PC cannot use another device.

Particularly when the device is an IC card reader, it is required to periodically make a query (polling) as to whether or not the IC card has been detected, i.e. to carry out a device monitoring process (change-of-state detection process) periodically. In general, the device monitoring process is executed by a device driver installed in a client PC.

For this reason, the IC card reader is frequently occupied by the client PC via the network, and traffic on the network considerably increases during the occupation of the device. Therefore, it is desirable that the occupation of the device is minimized.

Further, in a state where a device is frequently occupied and data is constantly flowing on a network, data is vulnerable to hacking. This is undesirable in terms of security.

In addition, when the above-mentioned device monitoring process (change-of-state detection process) is configured such that a device server stores only trigger detection algorithms applicable to specific devices, so as to eliminate model-dependence which makes processing different on a device-by-device basis, the device server loses its flexibility. On the other hand, when trigger detection algorithms applicable to various devices existing in the system are all stored in a device server, it is possible to maintain the flexibility of the device server. However, the device server needs a large-capacity storage area, which causes an increase in manufacturing costs.

It is a first object of the present invention to provide a device control apparatus, a client apparatus, a device control method, and a device control system, in which the device control apparatus is provided with a device monitoring process (change-of-state detection process) conventionally implemented in a client apparatus, whereby the device control apparatus monitors a state change of a device independently without communication with a client apparatus, and when a state change of the device is detected, the device control apparatus notifies the client apparatus of the detection of the state change, thereby dispensing with the need for device monitoring (polling) by the client apparatus and making it possible to reduce traffic on the network.

It is a second object of the present invention to provide a device control apparatus, a client apparatus, a device control method, and a device control system, in which communication between the client apparatus and the device is performed using a state change of the device as a trigger, whereby the client apparatus is enabled to occupy the device only when the client apparatus needs to occupy the device and thus the vulnerability of security is reduced, and use a plurality of devices simultaneously even if occupation of each device is frequently required.

It is a third object of the present invention to provide a device control apparatus, a client apparatus, a device control method, and a device control system, in which a trigger detection algorithm and a definition file applicable to a device currently monitored are dynamically installed into or downloaded from the device server, whereby the device server is capable of executing detection processing for various devices while maintaining its flexibility.

Solution to Problem

To attain the above objects, according to a first aspect of the present invention, there is provided a device control apparatus connected to a client apparatus via a network and to which a device is to be locally connected, comprising device information acquisition means configured to acquire device information for identifying a device locally connected to the device control apparatus, monitoring information acquisition means configured to acquire at least one of a trigger detection algorithm and a definition file for monitoring a state change of a device identified based on the device information acquired by the device information acquisition means, according to the device information, monitoring information storage means configured to store at least one of the trigger detection algorithm and the definition file acquired by the monitoring information acquisition means, device monitoring means configured to monitor the locally connected device based on at the least one of the trigger detection algorithm and the definition file stored in the monitoring information storage means, trigger notification transmission means configured to be operable when a state change of the device is detected by the device monitoring means, to transmit a trigger notification indicative of the detection of the state change to the client apparatus via the network, and session control means configured to start a session with the client apparatus in response to a connection request from the client apparatus having received the trigger notification.

To attain the above objects, according to a second aspect of the present invention, there is provided a client apparatus connected, via a network, to a device control apparatus to which a device is to be locally connected, comprising device information acquisition means configured to acquire, from the device control apparatus, device information on the device which is locally connected to the device control apparatus, monitoring information storage means configured to store at least either of one or more trigger detection algorithms and one or more definition files for monitoring a state change of the device, monitoring information identification means configured to identify at least one of a trigger detection algorithm and a definition file appropriate to a device identified based on the device information acquired by the device information acquisition means, from the at least either of the trigger detection algorithms and the definition files stored in the monitoring information storage means, monitoring information transmission means configured to transmit the at least one of the trigger detection algorithm and the definition file identified by the monitoring information specification means to the device control apparatus, trigger notification reception means configured to receive a trigger notification indicative of detection of a state change of the device from the device control apparatus having detected the state change of the device, and session means configured to start a session with the device control apparatus in response to the trigger notification received by the trigger reception means.

To attain the above objects, according to a third aspect of the present invention, there is provided a device control method executed by a device control apparatus connected to a client apparatus via a network and to which a device is to be locally connected, comprising a device information acquisition step of acquiring device information for identifying a device locally connected to the device control apparatus, a monitoring information acquisition step of acquiring at least one of a trigger detection algorithm and a definition file for monitoring a state change of a device identified based on the device information acquired in the device information acquisition step, according to the device information, a monitoring information storage step of storing the at least one of the trigger detection algorithm and the definition file acquired in the monitoring information acquisition step, a device monitoring step of monitoring the locally connected device based on at least one of the trigger detection algorithm and the definition file stored in the monitoring information storage step, a trigger notification transmission step of transmitting, when a state change of the device is detected in the device monitoring step, a trigger notification indicative of the detection of the state change to the client apparatus via the network, and a session control step of starting a session with the client apparatus in response to a connection request from the client apparatus having received the trigger notification.

To attain the above objects, according to a fourth aspect of the present invention, there is provided a device control method executed by a client apparatus connected, via a network, to device control apparatuses to which a device is to be locally connected, comprising a device information acquisition step of acquiring, from the device control apparatus, device information on the device which is locally connected to the device control apparatus, a monitoring information storage step of storing at least either of one or more trigger detection algorithms and one or more definition files for monitoring a state change of the device, a monitoring information identification step of identifying at least one of a trigger detection algorithm and a definition file appropriate to a device identified based on the device information acquired in the device information acquisition step, from at least either of the trigger detection algorithms and the definition files stored in the monitoring information storage step, a monitoring information transmission step of transmitting the at least one of the trigger detection algorithm and the definition file identified in the monitoring information specification step to the device control apparatus, a trigger notification reception step of receiving a trigger notification indicative of detection of a state change of the device from the device control apparatus having detected the state change of the device, and a session step of starting a session with the device control apparatus in response to the trigger notification received in the trigger reception step.

To attain the above objects, according to a fifth aspect of the present invention, there is provided a device control system including a device control apparatus and a client apparatus connected to each other via a network and configured such that a device is to be locally connected to the device control apparatus, wherein the device control apparatus comprises device information acquisition means configured to acquire device information for identifying a device locally connected to the device control apparatus, monitoring information acquisition means configured to acquire at least one of a trigger detection algorithm and a definition file for monitoring a state change of a device identified based on the device information acquired by the device information acquisition means, according to the device information, first monitoring information storage means configured to store the at least one of the trigger detection algorithm and the definition file acquired by the monitoring information acquisition means, device monitoring means configured to monitor the locally connected device based on the at least one of the trigger detection algorithm and the definition file stored in the first monitoring information storage means, trigger notification transmission means configured to be operable when a state change of the device is detected by the device monitoring means, to transmit a trigger notification indicative of the detection of the state change to the client apparatus via the network, and session control means configured to start a session with the client apparatus in response to a connection request from the client apparatus having received the trigger notification, and wherein the client apparatus comprises device information acquisition means configured to acquire, from the device control apparatus, device information on the device which is locally connected to the device control apparatus, second monitoring information storage means configured to store at least either of one or more trigger detection algorithms and one or more definition files for monitoring a state change of the device, monitoring information identification means configured to identify at least one of a trigger detection algorithm and a definition file appropriate to a device identified based on the device information acquired by the device information acquisition means, from the at least either of the trigger detection algorithms and the definition files stored in the second monitoring information storage means, monitoring information transmission means configured to transmit the at least one of the trigger detection algorithm and the definition file identified by the monitoring information specification means to the device control apparatus, trigger notification reception means configured to receive a trigger notification indicative of detection of a state change of the device from the device control apparatus having detected the state change of the device, and session means configured to start a session with the device control apparatus in response to the trigger notification received by the trigger reception means.

Advantageous Effects of Invention

According to the present invention, the device control apparatus is provided with a device monitoring process (change-of-state detection process) conventionally implemented in a client apparatus, whereby a state change of a device is monitored independently without communication with a client apparatus, and when a state change of the device is detected, the device control apparatus notifies the client apparatus of the detection of the state change. Therefore, the need for device monitoring (polling) by the client apparatus is dispensed with, which makes it possible to reduce traffic on a network.

According to the present invention, communication between the client apparatus and the device is established using a state change of the device as a trigger, whereby the client apparatus is enabled to occupy the device only when the client apparatus needs to occupy the device and thus the vulnerability of security is reduced, and use a plurality of devices simultaneously even if occupation of the devices is frequently required.

According to the present invention, at least one of a trigger detection algorithm and a definition file applicable to a device currently monitored is dynamically installed into or downloaded from the device control apparatus, whereby the device control apparatus can execute detection processing for various devices while maintaining its flexibility.

BRIEF DESCRIPTION OF DRAWINGS

FIG. 6 is a diagram useful in explaining the data structure of an electronic message (packet) of an installation protocol, which contains the definition file 115 and the trigger detection algorithm 116 transmitted in a step S511 in FIG. 5.

DESCRIPTION OF EMBODIMENTS

The present invention will now be described in detail below with reference to the drawings showing embodiments thereof.

In the following, a description will be given of a first embodiment of the present invention.

<1. Configuration of Device Control System>

Figure 1:
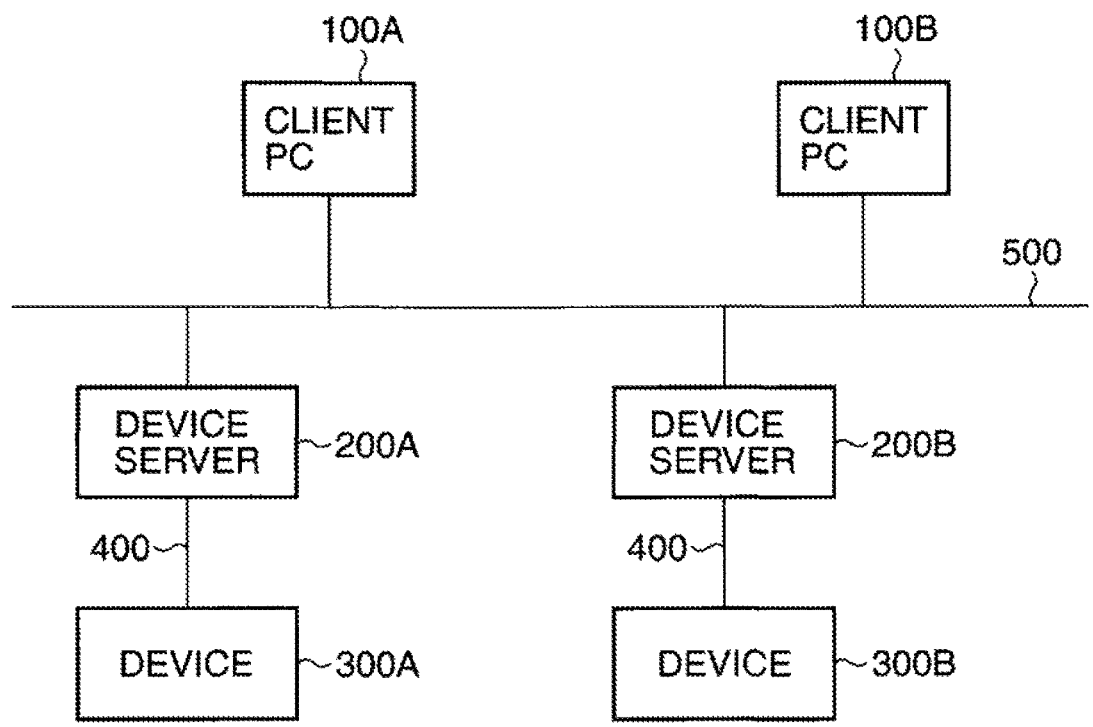
FIG. 1 is a schematic block diagram of a device control system according to a first embodiment of the present invention.

FIG. 1 is a schematic block diagram of a device control system according to the first embodiment of the present invention.

As shown in FIG. 1, the device control system comprises client PCs 100 (100A, 100B), device servers 200 (200A, 200B), and devices 300 (300A, 300B).

The device server 200 and the device 300 are connected to each other via a connection cable 400 compliant with an interface, such as USB (universal serial bus) or IEEE 1394. Further, the device server 200 and the client PCs (PC 100A, PC 100B) are connected to each other via a wired or wireless network 500.

Next, the apparatuses forming the device control system in FIG. 1 will be sequentially described.

<2. Configuration of Client PC 100>

Figure 2:
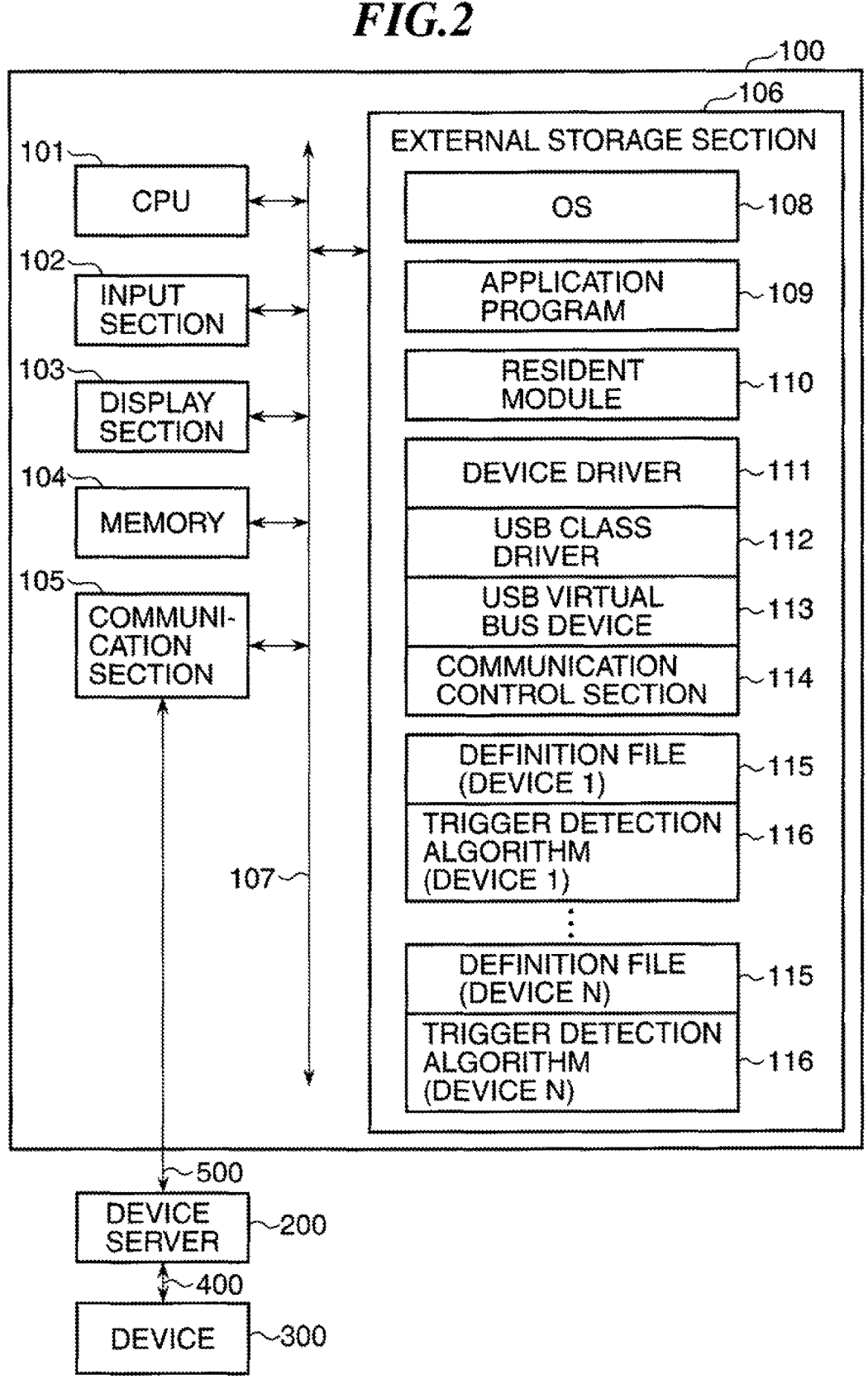
FIG. 2 is a block diagram useful in explaining the hardware configuration and software configuration of a client PC 100 appearing in FIG. 1.

FIG. 2 is a block diagram useful in explaining the hardware configuration and software configuration of the client PC 100 appearing in FIG. 1.

Referring to FIG. 2, the client PC 100 is an example of a client apparatus according to the first embodiment of the present invention. The client PC 100 includes a CPU 101, an input section 102, a display section 103, a memory 104, a communication section 105, and an external storage section 106, which are connected to each other via an internal bus 107.

The CPU 101 functions as a central processing control unit, and executes predetermined programs stored in the memory 104 or the external storage section 106 to thereby perform overall control of the operation of the client PC 100.

The input section 102 functions as an operating section via which various input operations, instruction operations, and so forth are performed. The input section 102 includes a keyboard, a mouse, etc.

The display section 103 functions as a display for displaying various screens, etc. The display section 103 is incorporated in the client PC 100 or externally connected to the same.

The memory 104 functions as a storage area comprising a ROM (read only memory) and a RAM (random access memory). The memory 104 stores predetermined programs and data.

The communication section 105 provides interface for network packet transmission/reception and communication control compatible with a communication method employed by the network 500 implemented e.g. by a wired network, such as an Ethernet (registered trademark), or a wireless network using IEEE 802.11a or IEEE 802.11g. The client PC 100 can perform data transmission/reception to and from the device server 200 via the communication section 105.

The external storage section 106 stores various software programs and various kinds of data, such as an OS 108, an application program 109, a resident module 110, a device driver 111, a USB class driver 112, a USB virtual bus device 113, a communication control section 114, definition files 115, and trigger detection algorithms 116.

Under the control of the CPU 101, the software program(s) and/or data stored in the external storage section 106 are/is read into the memory 104 and are/is executed.

The device driver 111, the USB class driver 112, and the USB virtual bus device 113 are driver software components dynamically generated through acquisition and registration of device information on the device 300 by the resident module 110.

The application program 109 is a software component for delivering a data transmission/reception request to the device 300 via the driver software components (the device driver 111, the USB class driver 112, and the USB virtual bus device 113) and the communication control section 114.

In the following, detailed descriptions will be sequentially given of the resident module 110, the device driver 111, the USB class driver 112, the USB virtual bus device 113, the communication control section 114, the definition files 115, and the trigger detection algorithms 116.

The resident module 110 is a software component constantly on standby or operating when the OS 108 is active. The resident module 110 performs data transmission/reception to and from the device server 200 on the network 500 to thereby recognize a device 300 connected to the device server 200 and receive device information on the device 300. Then, the resident module 110 uniquely identifies driver software components (the USB virtual bus device 113, the USB class driver 112, and the device driver 111) required for data transmission/reception to and from the device 300, based on the received device information, and sequentially generates the driver software components dynamically.

The device driver 111 is a software component that generates a control command to be issued to a device 300, in response to an instruction e.g. from the OS 108 or the application program 109 (hereinafter referred to as "the higher-layer software"), and sends a response to the control command from the device 300 to the higher-layer software.

The USB class driver 112 is a software component that generates a plug-and-play event and generates a USB port for use in transmission/reception of a control command, thereby loading the device driver 111 in an upper layer. Further, the USB class driver 112 is a software component that converts a control command generated by the device driver 111 to a USB packet to deliver the USB packet to the USB virtual bus device 113, and converts a USB packet received from the USB virtual bus device 113 to a control command to deliver the control command to the device driver 111.

The USB virtual bus device 113 is a software component that provides, when a data transmission/reception request is received from the application program 109 via the device driver 111 and the USB class driver 112, the same behavior (virtualization control) as in a case where a device 300 is directly connected (locally connected) to the client PC 100. This "virtualization control" enables data transmission/reception in a state similar to a state where the device 300 is locally connected to the client PC 100.

The communication control section 114 is a software component that performs protocol conversion between a USB packet received from the USB virtual bus device 113 and a network packet for communication performed via the device server 200 and the network 500, to thereby control data transmission/reception to and from the device server 200 via the communication section 105. Upon receipt of a data transmission/reception request sent from the application program 109 via the USB virtual bus device 113, the communication control section 114 starts a session (connection) with the device server 200, and disconnects the session after completion of data transmission/reception.

Figure 7:
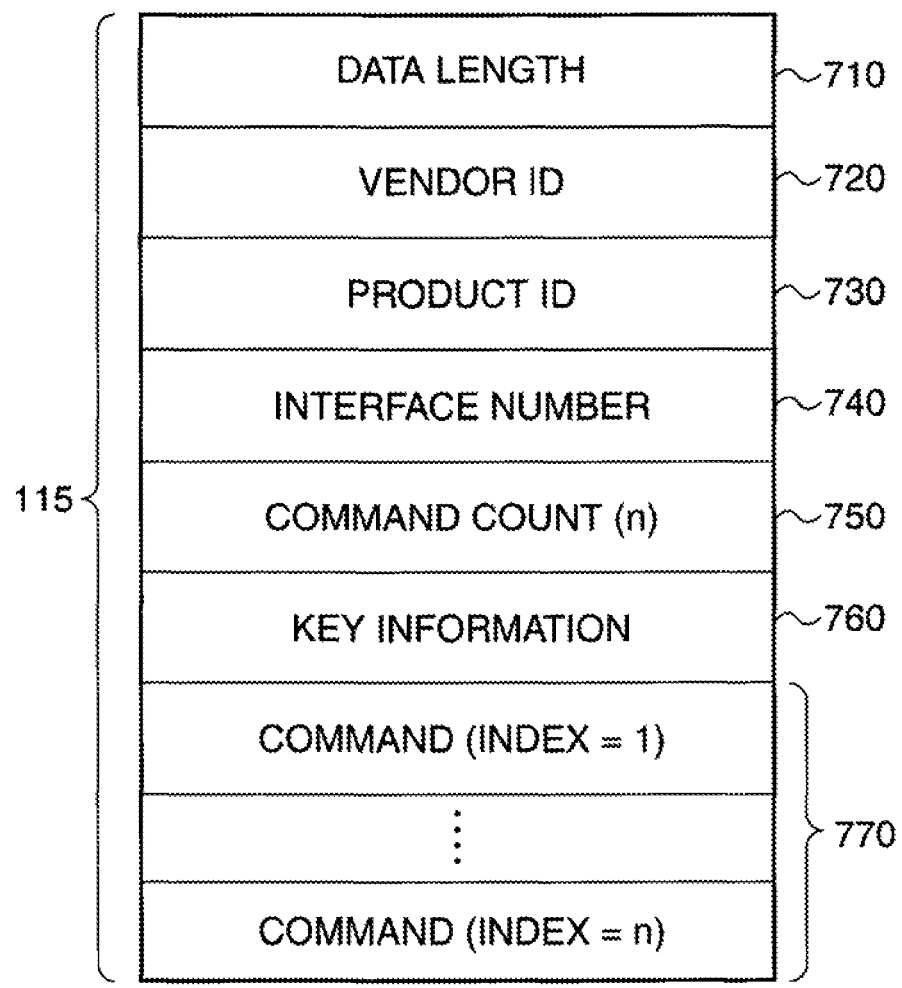
FIG. 7 is a diagram useful in explaining the data structure of the definition file 115 appearing in FIG. 6.

Each of the definition files 115 is a data file storing commands, information, etc. associated with the trigger detection algorithm 116, which is necessitated when the device server 200 executes monitoring of a device 300 (FIG. 7).

Each of the trigger detection algorithms 116 is a program code describing an execution procedure in which the device server 200 monitors a target device 300 and detects a state change of the device 300. An associated definition file 115 is read in for execution of change-of-state detection, and a monitoring process (hereinafter referred to as "the trigger detection process") associated with the device 300 is executed according to the above-mentioned execution procedure.

The definition file 115 and the trigger detection algorithm 116 are a pair of monitoring programs (monitoring information) for monitoring the device 300. Each of the definition file 115 and the trigger detection algorithm 116 differs according to the model of a device 300. For this reason, the client PC 100 stores one or more definition files 115 and one or more trigger detection algorithms 116 corresponding to respective devices 300. FIG. 2 shows that definition files 115 and trigger detection algorithms 116 for N models in which N=1 to N.

<3. Configuration of Device Server 200>

Figure 3:
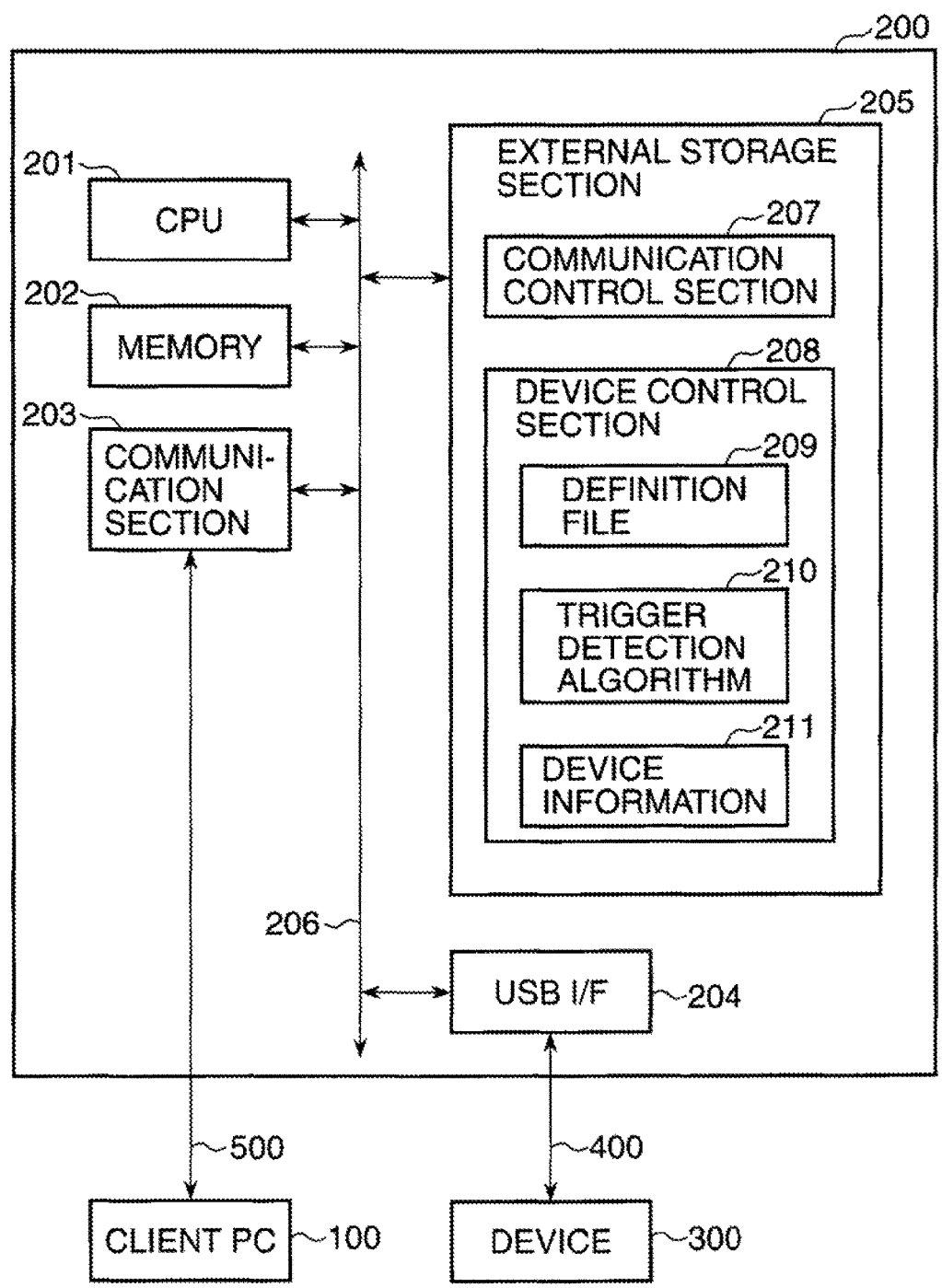
FIG. 3 is a block diagram useful in explaining the hardware configuration and software configuration of a device server 200 appearing in FIG. 1.

FIG. 3 is a block diagram useful in explaining the hardware configuration and software configuration of the device server 200 appearing in FIG. 1.

Referring to FIG. 3, the device server 200 is an example of the device control apparatus according to the first embodiment of the present invention. The device server 200 includes a CPU 201, a memory 202, a communication section 203, a USB interface 204, and an external storage section 205, which are connected to each other via an internal bus 206.

The CPU 201, the memory 202, the communication section 203, and the internal bus 206 are identical in configuration to those of the client PC 100.

The USB interface 204 provides interface for connection to a device 300. The USB interface 204 functions as an input and output interface compliant e.g. with USB (universal serial bus) specifications.

The external storage section 205 stores software functional units, such as a communication control section 207 and a device control section 208, and data.

The software functional unit(s) and/or data stored in the external storage section 205 are/is read into the memory 202 and are/is executed under the control of the CPU 201.

In the following, the communication control section 207 and the device control section 208 will be described sequentially in detail.

The communication control section 207 controls (starts and disconnects) a session with the client PC 100 connected thereto via the communication section 203 and the network 500. The communication control section 207 performs protocol conversion between a network packet transmitted or received to or from the client PC 100 and a USB packet transmitted or received to or from a device 300, to thereby intermediate (relay) data transmission/reception between the client PC 100 and the device 300.

The device control section 208 is a functional unit that stores a definition file 209, a trigger detection algorithm 210, and device information 211, and detects a state change of a device 300 while monitoring the device 300, to thereby notify the client PC 100 of the detection of the state change.

The definition file 209 and the trigger detection algorithm 210 stored in the device control section 208 are identical in configuration to the definition file 115 and the trigger detection algorithm 116 stored in the external storage section 106 of the client PC 100. However, the device server 200 stores a definition file 209 and a trigger detection algorithm 210 needed only for monitoring (polling) of a device 300 connected to the device server 200.

The device information 211 is information for identifying a device 300. The device information 211 includes a vender ID (VID) assigned on a device manufacturer basis so as to identify each manufacturer, a product ID (PID) assigned on a device model basis so as to identify each model, and a serial number assigned on a device basis so as to identify each device. This device information is acquired from a device 300 by the device control section 208 e.g. when the device 300 is connected to the device server 200.

The device control section 208 identifies the model of a connected device 300 based on the device information 211 acquired from the device 300. Further, the device control section 208 receives a definition file 115 and a trigger detection algorithm 116 associated with the identified model of the device 300 from the client PC 100, and stores the received definition file 115 and trigger detection algorithm 116 in the memory 202, as a definition file 209 and a trigger detection algorithm 210. Then, the device control section 208 executes a monitoring (polling) process, described hereinafter with reference to FIG. 10, on the connected device 300 at predetermined time intervals, using the stored definition file 209 and trigger detection algorithm 210, to thereby detect a state change of the device 300 and notify the client PC 100 of the detected state change.

A state change of a device includes, for example, execution of a card reading operation on a card reader, depression of an operation button of a printer or a scanner, etc. The client PC 100 starts a session with the device server 200 using detection of a state change of the device 300 as a trigger.

<4. Configuration of Device 300>

The devices 300 (300A, 300B) is a general-purpose input and output device having a USB interface, and is e.g. a single function peripheral (SFP), such as a card reader or a printer, or a multi-function peripheral (MFP) equipped with not only a print function, but also a scan function, a copy function, and a storage function. However, this is not limitative, but the device 300 may be any other kind of device.

Further, although in the present embodiment, the device server 200 and the device 300 are formed as separate apparatuses, this is not limitative, but the device server 200 and the device 300 may be integrated into a single apparatus such that the device server 200 is accommodated in the casing of the device 300.

In the device control system in FIG. 1, formed by the above-described apparatuses, the device server 200 acquires device information on the device 300 connected thereto, and sends the device information to the client PC 100. The client PC 100 reads out a definition file 115 and a trigger detection algorithm 116 for detecting a state change of the device 300 from the external storage section 106, based on the acquired device information on the device 300, and sends the definition file 115 and the trigger detection algorithm 116 to the device server 200. The device server 200 stores the definition file 115 and the trigger detection algorithm 116 received from the client PC 100 as a definition file 209 and a trigger detection algorithm 210 in the device control section 208, and monitors (polls) the device 300 using the definition file 209 and the trigger detection algorithm 210. Upon detecting the state change of the device 300, the device control section 208 sends information indicative of detection of the state change (hereinafter referred to as "the trigger notification") to the client PC 100 via the communication control section 207 and the communication section 203. Upon receipt of the trigger notification from the device server 200, the client PC 100 starts a session with the device server 200 and performs data transmission/reception to and from the device 300 via the device server 200.

<5. Process Executed when Device 300 is Connected to Device Server 200>

Figure 4:
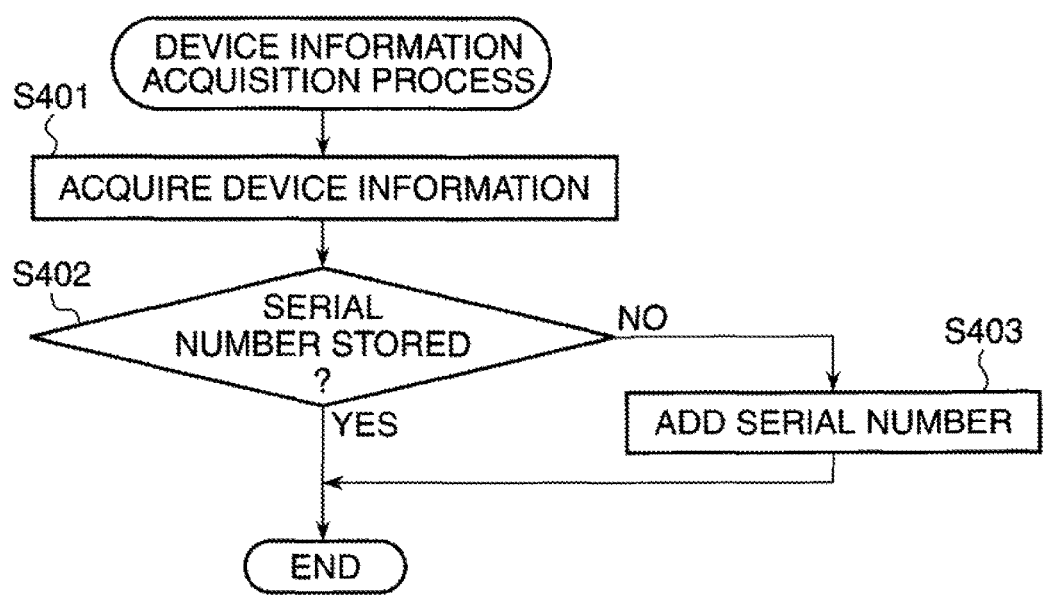
FIG. 4 is a flowchart of a device information acquisition process executed by the device server 200 in FIG. 3 when a device 300 is connected to the device server 200.

FIG. 4 is a flowchart of a device information acquisition process executed by the device server 200 when a device 300 is connected to the device server 200 in FIG. 3.

Referring to FIG. 4, when the device 300 is connected to the device server 200, the device server 200 executes the present device information acquisition process.

First, the device control section 208 acquires device information for identifying the device 300 from the device 300 via the USB interface 204 and stores the device information in the device control section 208 (step S401). Device information includes a vendor ID (VID) on a device manufacturer basis for identification of a manufacturer, a product ID (PID) assigned on a device model basis for identification of the model, and a serial number assigned on a device basis for identification of the device.

Then, the device control section 208 determines whether or not the device information acquired from the device 300 stores a serial number (step S402).

If it is determined in the step S402 that the acquired device information does not store a serial number (NO to the step S402), a serial number is generated from unique information of the device server 200 and connection port-unique information of the device server 200, and the serial number is added to the device information (step S403), followed by terminating the present process. On the other hand, if the acquired device information stores a serial number (YES to the step S402), the present process is immediately terminated. Thus, even when a plurality of devices 300 of the same type, which do not store respective serial numbers, are connected to the device server 200, it becomes possible to identify each of the devices 300.

In the present process, in a case where a plurality of devices 300 are connected to the device server 200, the present device information acquisition process is repeatedly carried out on a device-by-device basis.

The unique information of the device server 200 is information for identifying the device server 200. The unique information includes an IP address, a MAC address, a serial number (manufacture number) assigned to the device server 200, etc., for example. However, the unique information is not limited to one of these information items, but may be any combination of them.

The connection port-unique information of the device server 200 is information for identifying a connection port of the device server 200. The connection port-unique information includes the number of a USB port and the number of an IEEE 1394 port provided in the device server 200, for example, but is not limited to these.

<6. Virtualization Control Process Associated with Device 300 and Transmission Process for Transmission of Definition File, Etc., which are Executed by Client PC 100>

Figure 5:
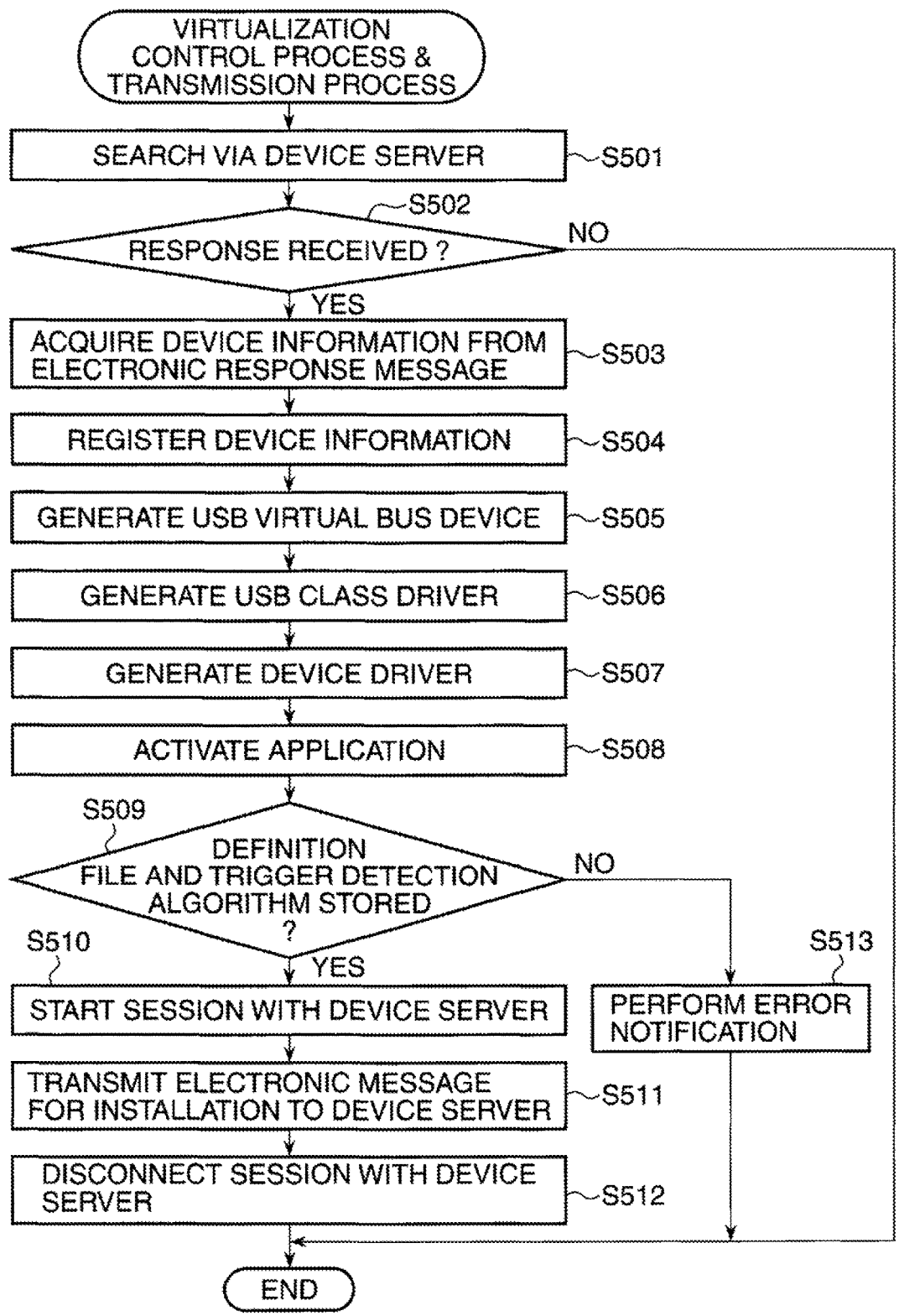
FIG. 5 is a flowchart of a virtualization control process associated with the device 300 and a transmission process for transmitting a definition file 115 and a trigger detection algorithm 116, which are executed by the client PC 100 appearing in FIG. 1.

FIG. 5 is a flowchart of a virtualization control process associated with a device 300 and a transmission process for transmitting a definition file 115 and a trigger detection algorithm 116, which are executed by the client PC 100 appearing in FIG. 1.

<6-1. Virtualization Control Process Associated with Device 300, which is Executed by Client PC 100>

Referring to FIG. 5, in order to recognize a device 300 connected to the network 500 via the device server 200, the resident module 110 in the client PC 100 broadcasts a search packet to the device server 200 via the communication section 105 (step S501). Specifically, the resident module 110 searches via (queries) the device server 200 using UDP (user datagram protocol) or the like protocol.

The resident module 110 awaits a response from the device server 200 (step S502). If there is no response from the device server 200 (NO to the step S502), the resident module 110 terminates the present process without executing the virtualization control process.

On the other hand, if there is a response from the device server 200 (YES to the step S502), the resident module 110 acquires device information (descriptor) contained in a response electronic message from the device server 200 (step S503).

The resident module 110 identifies the device based on a vender ID (VID) and a product ID (PID) described in a device descriptor and a serial number and a device name described in a string descriptor, which are contained in the acquired device information. Further, the resident module 110 identifies an interface number described in an interface descriptor. Based on the information concerning the individual device identified as above, the resident module 110 uniquely indentifies driver software components (the USB virtual bus device 113, the USB class driver 112, and the device driver 111) needed for the virtualization control process (step S504), and then sequentially generates the driver software components dynamically (steps S505 to S507).

Thereafter, the resident module 110 activates the application program 109, and activates an interface for controlling the driver software components from the application program 109 (step S508). Thus, the virtualization control process associated with the device 300 is started.

<6-2. Transmission Process for Transmission of Definition File, Etc., which is Executed by Client PC 100>

Then, the client PC 100 identifies the type (model) of the device 300 based on the acquired device information and determines whether or not a definition file 115 and a trigger detection algorithm 116 associated with the device 300 are stored in the external storage section 106 (step S509).

If the definition file 115 and the trigger detection algorithm 116 associated with the device 300, which are identified based on the acquired device information, are stored in the external storage section 106 (YES to the step S509), the client PC 100 starts a session with the device server 200 (step S510). Then, the client PC 100 encodes an electronic message (packet) for installation, described hereinafter with reference to FIG. 6, which contains the definition file 115 and the trigger detection algorithm 116 associated with the device 300, and sends the electronic message (packet) to the device server 200 to which is connected the device 300 (step S511). After transmission of the electronic message, the client PC 100 disconnects the session with the device server 200 (step S512), followed by terminating the present process.

On the other hand, if the definition file 115 and the trigger detection algorithm 116 associated with the device 300, which are identified based on the acquired device information, are not stored in the external storage section 106 (NO to the step S509), the client PC 100 performs error notification (step S513), followed by terminating the present process. The error notification is realized by notifying a user e.g. via the display section 103 that the associated definition file 115 and trigger detection algorithm 116 are not stored and prompting the user to install the definition file 115 and the trigger detection algorithm 116.

<7. Data Structure of Packet for Installation>

FIG. 6 is a diagram useful in explaining the data structure of an electronic message (packet) of an installation protocol, which contains the definition file 115 and the trigger detection algorithm 116 transmitted in the step S511 in FIG. 5.

The packet comprises signature data 610, an electronic message size 620, a command ID 630, a vendor ID 640, a product ID 650, a serial number 660, a definition file 115, and a trigger detection algorithm 116.

Based on the vendor ID 640, the product ID 650, and the serial number 660 included in the above-mentioned items, it is possible to uniquely identify the type (model) of the device 300. From N pairs of definition files 115 and trigger detection algorithms 116 stored in the external storage section 106, an associated pair of a definition file 115 and a trigger detection algorithm 116 are selected for each device 300 identified based on the acquired device information, and are stored in the packet. The number of pairs that can be selected is not limited to 1, but a plurality of pairs may be selected.

<7-1. Data Structure of Definition File 115>

FIG. 7 is a diagram useful in explaining the data structure of the definition file 115 appearing in FIG. 6.

Referring to FIG. 7, the definition file 115 contains commands and information required for execution of a trigger detection algorithm 116. The definition file 115 comprises a data length 710, a vendor ID 720 and a product ID 730 assigned to a device 300 associated with the trigger detection algorithm 116, an interface number 740, a command count (n) 750, key information 760 for use in determining, based on a response from the device 300, whether or not the state of the device 300 has changed, and one or more commands 770 describing a procedure necessary for the trigger detection process (monitoring process) associated with the device 300. The commands 770 have indexes 1 to n assigned thereto (n: value of the command count (n) 750), respectively, in the mentioned order.

<7-2. Data Structure of Command>

Figure 8:
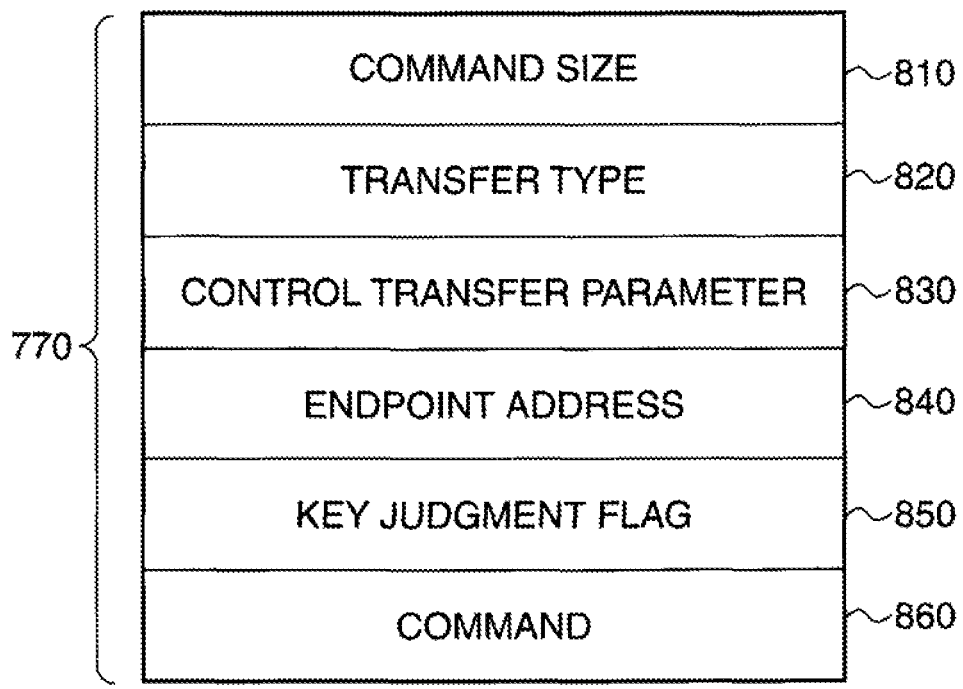
FIG. 8 is a diagram useful in explaining the data structure of a command 770 appearing in FIG. 7.

FIG. 8 is a diagram useful in explaining the data structure of the command 770 appearing in FIG. 7.

As shown in FIG. 8, the command 770 comprises a command size 810, a transfer type 820 defined by the USB standard necessary for issuing the command, a transfer parameter 830 to be sent by Setup Token of control transfer, an endpoint address 840, a key judgment flag 850 indicative of whether or not the response from the device 300 contains change-of-state information, and a device-specific command 860 to be issued to the device 300. The command 770 stores parameters for issuing one command.

<8. Flow of Control by Device Server 200>

Figure 9:
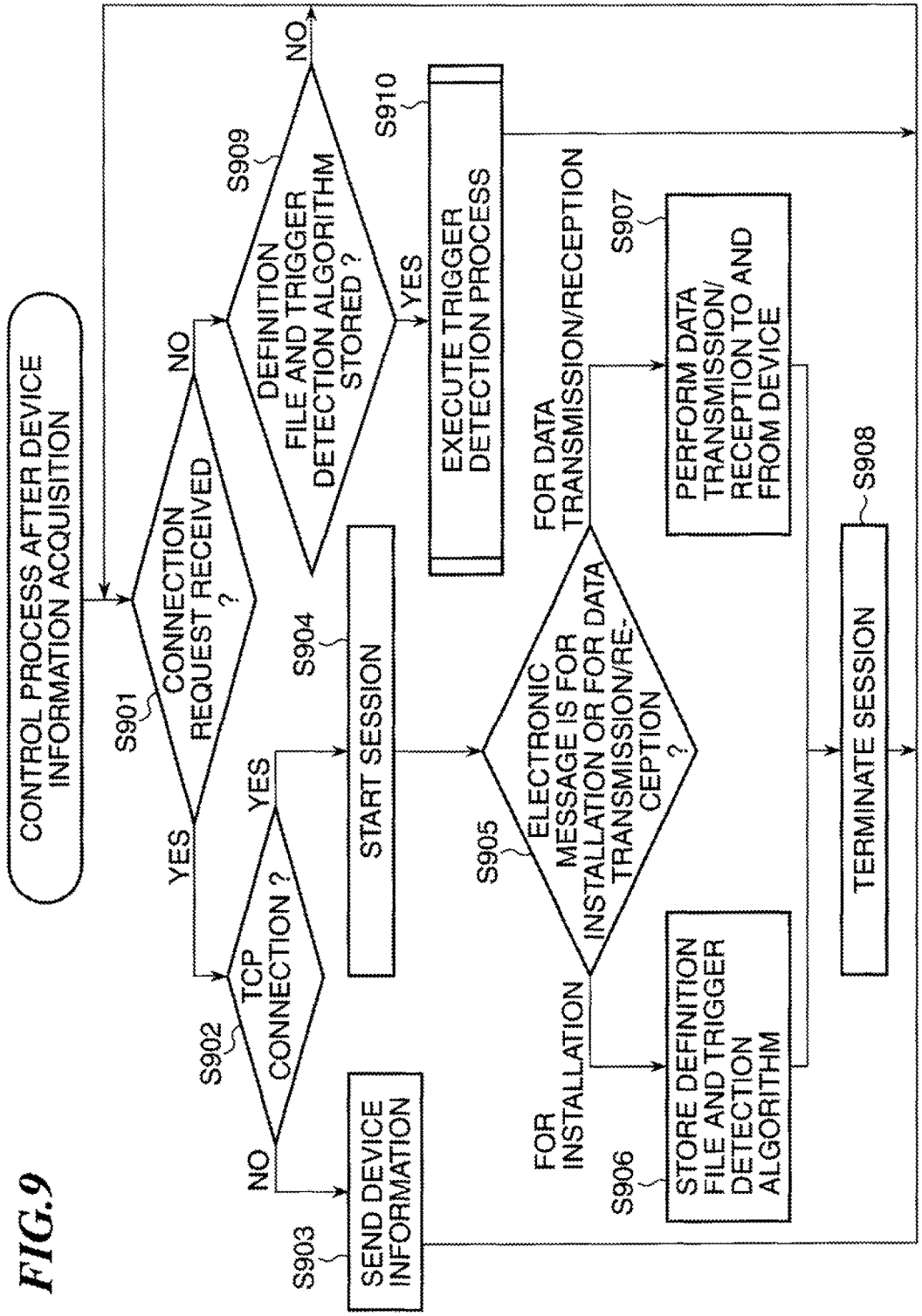
FIG. 9 is a flowchart of a control process after device information acquisition executed by the device server 200 appearing in FIG. 3.

FIG. 9 is a flowchart of a control process after device information acquisition executed by the device server 200 appearing in FIG. 3.

Referring to FIG. 9, the device server 200 is equipped with the following four functions:

(1) a function of notifying device information acquired from a device 300 to the client PC 100;

(2) a function of starting a session with the client PC 100 and receiving a definition file 115 and a trigger detection algorithm 116 necessary for monitoring the device 300;

(3) a function of starting a session with the client PC 100 and performing data transmission/reception between the client PC 100 and the device 300; and (4) a function of monitoring (polling) the device 300 at predetermined time intervals, detecting a state change of the device 300, and sending the trigger notification to the client PC 100.

<8-1. Processing for Transmitting Device Information>

The function (1) corresponds to steps S901 to S903 in FIG. 9.

The device server 200 determines whether or not a connection request has been received from the client PC 100 (step S901). When a connection request has been received (YES to the step S901), if the connection request is not a TCP connection request, but e.g. a UDP connection request (query) (NO to the step S902), the device server 200 notifies device information to the client PC 100 (step S903), and repeatedly carries out the steps S901 et seq.

<8-2. TCP Session Processing>

The function (2) and the function (3) correspond to the steps S901 to S902 and steps S904 to S908, in FIG. 9 respectively.

The device server 200 determines whether or not a connection request has been received from the client PC 100 (step S901). When a connection request has been received (YES to the step S901), if the connection request is a TCP connection request (YES to the step S902), the device server 200 starts a session with the client PC 100 (step S904).

Then, the communication control section 207 determines whether an electronic message (packet) received from the client PC 100 is for installation of a definition file 115 and a trigger detection algorithm 116 or for data transmission/reception (step S905).

If it is determined in the step S905 that the electronic message is for installation, the definition file 115 and the trigger detection algorithm 116 contained in the electronic message are stored in the device control section 208, as a definition file 209 and a trigger detection algorithm 210, respectively (step S906), and then the process proceeding to the step S908.

If it is determined in the step S905 that the electronic message is for data transmission/reception, data is transmitted/received to/from the device 300 (step S907), and then the process proceeds to the step S908. The data structure of a data transmission/reception packet of the data transmitted/received in the step S907 will be described in detail hereinafter with reference to FIG. 12.

In the following step S908, the session with the client PC 100 is disconnected (step S908), and the steps S901 et seq. are repeatedly carried out.

<8-3. Trigger Detection Process>

The function (4) corresponds to the step S901 and the steps S909 to S910 in FIG. 9.

Figure 10:
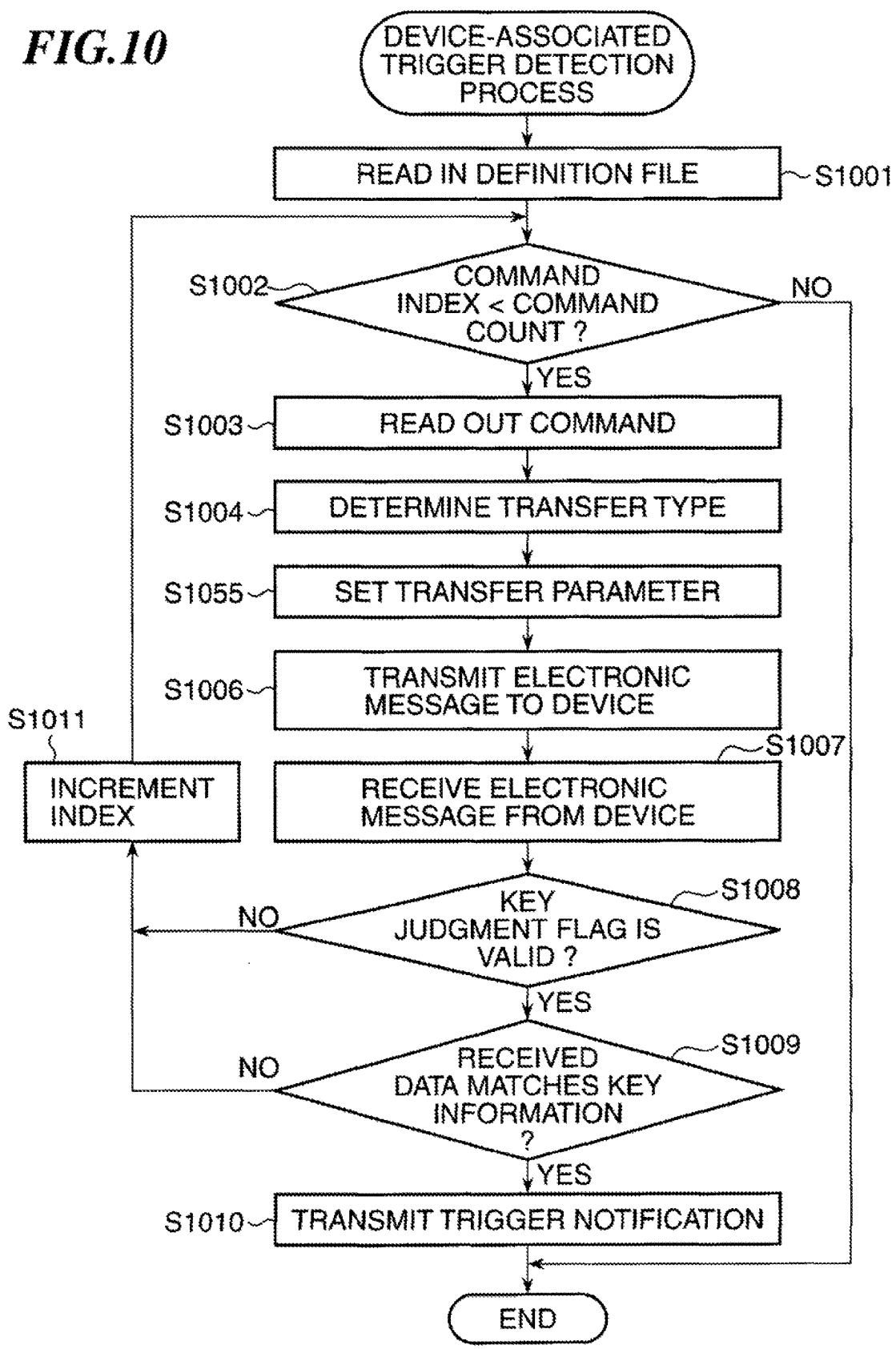
FIG. 10 is a flowchart of a trigger detection process executed by the device server 200 in a step S910 in FIG. 9.

When no connection request has been received from the client PC 100 and the device server 200 is on standby for reception (NO to the step S901), if a definition file 209 and a trigger detection algorithm 210 associated with a connected device 300 are stored in the device control section 208 (YES to the step S909), a trigger detection process (monitoring process) associated with the device 300, described hereinafter with reference to FIG. 10, is executed using the definition file 209 and the trigger detection algorithm 210 (step S910), and then the steps S901 et seq. are repeatedly carried out.

FIG. 10 is a flowchart of the trigger detection process executed by the device server 200 in the step S910 in FIG. 9.

Referring to FIG. 10, when the trigger detection algorithm 210 is started, the device control section 208 reads in the definition file 209, decodes the same into the form illustrated in FIG. 7, and then sets information specific to the device 300, which is necessary for the trigger detection process (monitoring process), in the memory 202 (step S1001).

Then, the device control section 208 determines whether or not an index assigned to the command 770 is smaller than the value of a command count (n) 750 (step S1002) to thereby determine whether or not the index has reached the value of the command count (n) 750 described in the definition file 209 (step S1002).

If it is determined in the step S1002 that the index has not reached the value of the command count (n) 750 described in the definition file 209 (YES to the step S1002), one of the commands 770 set in the memory 202 is read out, and the command 770 is decoded into the form illustrated in FIG. 8 (step S1003).

The device control section 208 determines a transfer type 820 described in the decoded command 770 (step S1004). The device control section 208 sets a transfer parameter 830 based on the result of the determination (step S1005), and then sends a electronic message having the transfer parameter 830 and a command 860 set therein to the device 300 (step S1006).

The device control section 208 awaits a response from the device 300 to the electronic message transmitted in the step S1006. Upon receipt of the response from the device 300 (step S1007), the device control section 208 determines whether or not the key judgment flag 850 of the command 770 is valid (step S1008).

If it is determined in the step S1008 that the key judgment flag 850 of the command 770 is valid (YES to the step S1008), the device control section 208 further determines whether or not the received data contains data matching the key information 760 (step S1009).

If it is determined in the step S1008 that the received data contains data matching the key information 760 (YES to the step S1009), the device control section 208 judges that a state change of the device 300 has been detected, and sends the trigger notification to the client PC 100 (step S1010), followed by terminating the present process.

On the other hand, if it is determined in the step S1008 that the key judgment flag 850 of the command 770 is invalid (NO to the step S1008) or if it is determined in the step S1009 that the received data does not contain data matching the key information 760, the index is incremented to read out a next command (step S1011), whereafter the steps S1002 et seq. are repeatedly carried out. Then, when it is determined in the step S1002 that the index has reached the value of the command count (n) 750 described in the definition file 209, which means that all the commands 770 have been read out (i.e. no state change has been detected), the present process is terminated.

<9. Control by Client PC 100 for Data Transmission/Reception>

Figure 11:
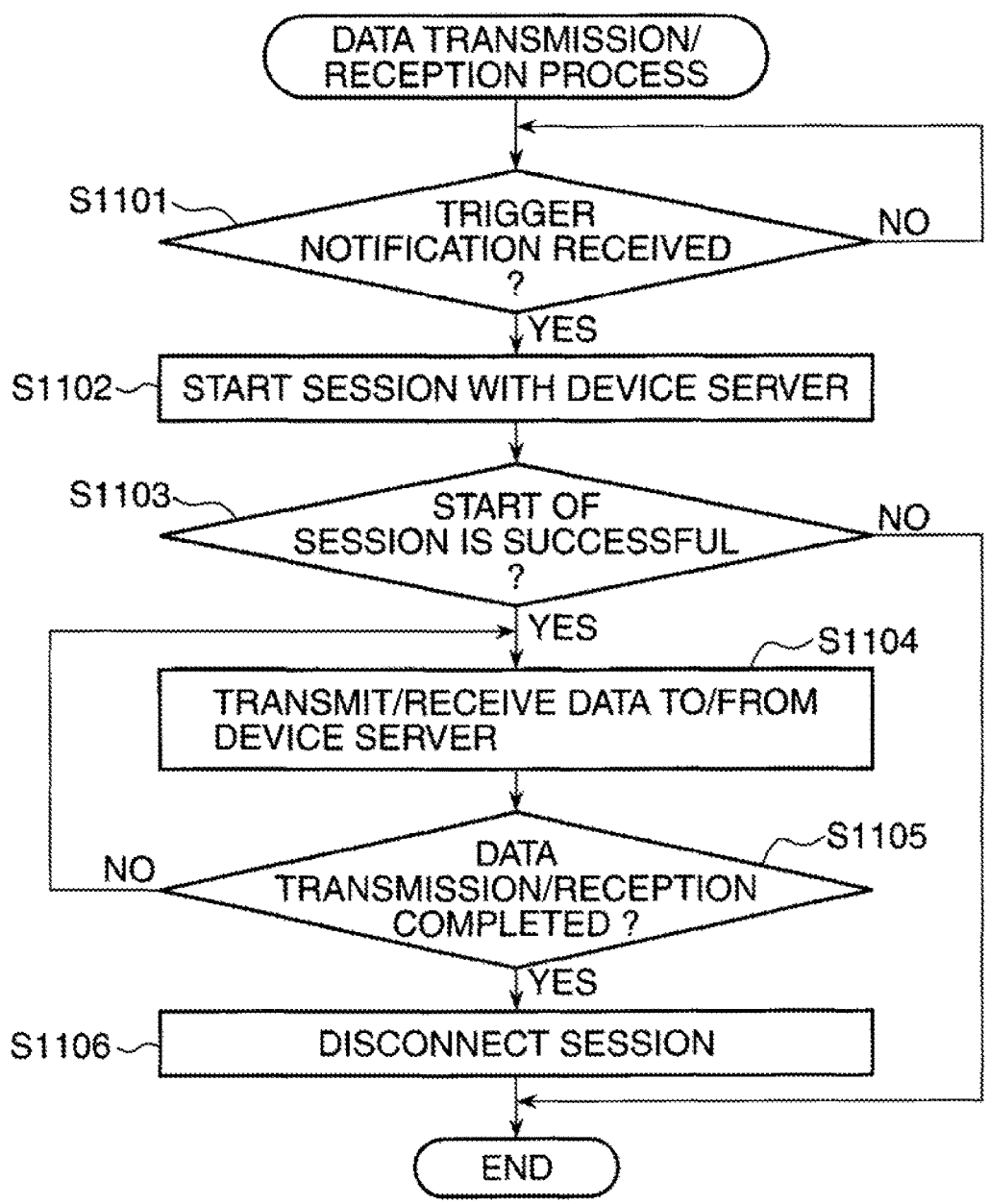
FIG. 11 is a flowchart of a data transmission/reception process executed by the client PC 100 appearing in FIG. 1.

FIG. 11 is a flowchart of a data transmission/reception process executed by the client PC 100 appearing in FIG. 1.

The present process is executed via a device stack (the device driver 111, the USB class driver 112, the USB virtual bus device 113, and the communication control section 114).

Referring to FIG. 11, the client PC 100 waits until the resident module 110 receives the trigger notification from the device server 200 (step S1101).

Upon receipt of the trigger notification from the device server 200 (YES to the step S1101), the resident module 110 notifies the application program 109 that the trigger notification has been received. When the application program 109 determines that data transmission/reception to and from the device 300 is required, the application program 109 starts a TCP session with the device server 200 via the communication control section 114 (step S1102).

When the start of the session with the device server 200 fails (NO to a step S1103), the present process is terminated.

When the start of the session with the device server 200 is successful (YES to the step S1103), the application program 109 performs data transmission/reception to and from the device server 200 via the device stack (the device driver 111, the USB class driver 112, the USB virtual bus device 113, and the communication control section 114) (step S1104). The data structure of a data transmission/reception packet transmitted/received in the step S1104 will be described in detail hereinafter with reference to FIG. 12.

The step S1104 is repeatedly carried out until data transmission/reception is completed (NO to a step S1105).

When data transmission/reception is all completed (YES to the step S1105), the client PC 100 disconnects the TCP session with the device server 200 (step S1106), followed by terminating the present process.

<10. Data Structure of Packet>

Figure 12:
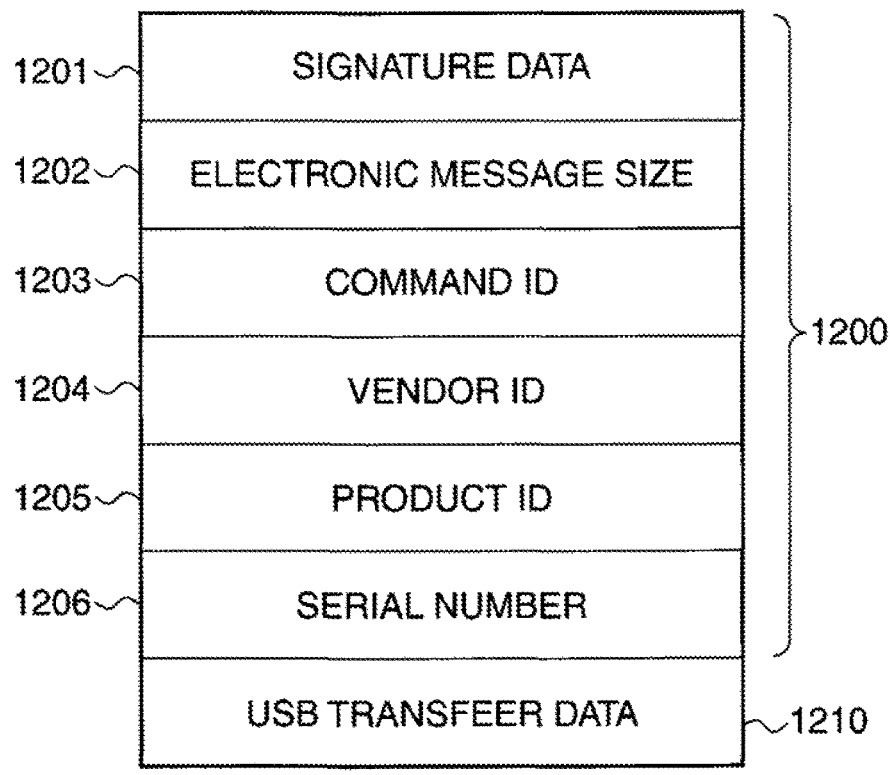
FIG. 12 is a diagram useful in explaining the data structure of a data transmission/reception packet transmitted/received in a step S907 in FIG. 9 or in a step S1104 in FIG. 11.

FIG. 12 is a diagram useful in explaining the data structure of the data transmission/reception packet transmitted/received in the step S907 in FIG. 9 or in the step S1104 in FIG. 11.

Referring to FIG. 12, the data transmission/reception packet comprises a protocol header 1200 and USB transfer data 1210. The device control section 208 analyzes the packet to thereby identify a device 300.

The protocol header 1200 includes signature data 1201 for identification of a protocol used in the present system, an electronic message size 1202, a command ID 1203 (bulk-in transfer request) assigned to a command issued to the device server 200, a vendor ID (VID) 1204, a product ID (PID) 1205, and a serial number 1206, etc.

The device 300 can be uniquely identified by the vendor ID 1204, the product ID 1205, and the serial number 1206 included in the above-mentioned items of the protocol header 1200.

As described hereinabove, the device server 200 of the present embodiment is equipped with the function for the device monitoring process (change-of-state detection process), which has conventionally been implemented in a client PC, so that the device server 200 can independently monitor a state change of a device 300 without communication with the client PC 100, and when the state change of the device 300 is detected, sends the detected state change to the client PC 100 as a trigger notification. Therefore, monitoring of the device 300 by the client PC 100 can be dispensed with, which makes it possible to reduce traffic on the network 500.

Further, according to the device server 200 of the present embodiment, since communication between the client PC 100 and the device 300 is established using a state change of the device 300 as a trigger, the client PC 100 can occupy the device 300 only when necessary, which makes it possible not only to reduce the vulnerability of security, but also to use a plurality of devices 300 simultaneously even if the occupation of each device 300 is frequently required.

Furthermore, according to the device server 200 of the present embodiment, the client PC 100 dynamically installs or downloads a trigger detection algorithm compatible with a device 300 to be monitored, into the device server 200, whereby it is possible to execute the trigger detection process for various devices 300 while maintaining the flexibility of the device server 200.

In the following, a description will be given of a second embodiment of the present invention.

The second embodiment is distinguished from the above-described first embodiment, in which the device server 200 is equipped with the trigger detection function, in that not the device server 200, but a network device equipped with the trigger detection function corresponds to the device control apparatus and detects a state change of the other device. The network device includes a device (e.g. a network printer) which is connected to a network, such as a LAN, such that it can be used by a plurality of users.

The configuration of the first embodiment described with reference to FIGS. 2 and 4 to 12 is all applicable to the second embodiment by interpreting description of the device server 200 as that of a network device 250.

Figure 13:
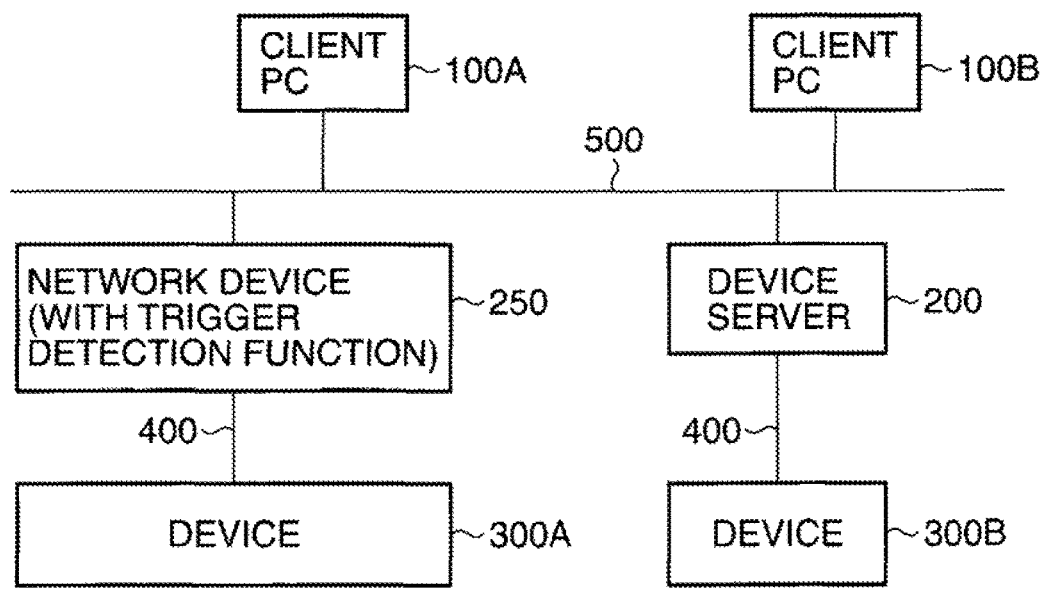
FIG. 13 is a schematic block diagram of a device control system according to a second embodiment of the present invention.

FIG. 13 is a schematic block diagram of a device control system according to the second embodiment of the present invention.

As shown in FIG. 13, the device control system of the second embodiment comprises a client PC 100 (100A, 100B), a network device 250, a device server 200, and a device 300 (300A, 300B). The device control system of the present embodiment is identical in configuration to the device control system of the first embodiment, described with reference to FIG. 1, except that the device server 200A is replaced by the network device 250.

Figure 14:
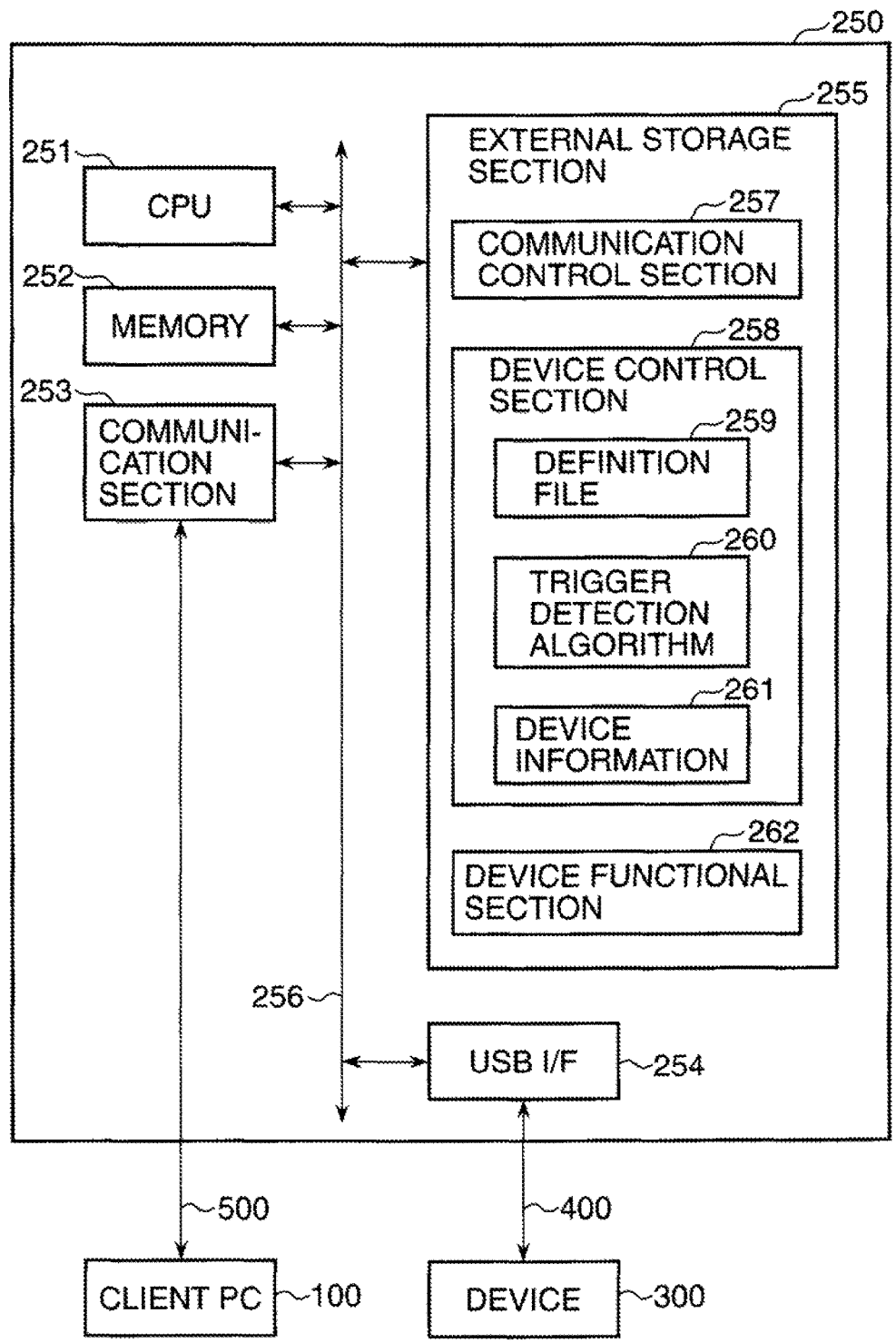
FIG. 14 is a block diagram useful in explaining the hardware configuration and software configuration of a network device 250 appearing in FIG. 13.

FIG. 14 is a block diagram useful in explaining the hardware configuration and software configuration of the network device 250 appearing in FIG. 13.

Referring to FIG. 14, the network device 250 is characterized by being equipped with the trigger detection function and having a device functional section 262 provided in an external storage section 255. Except for the additionally provided device functional section 262, each of a CPU 251, a memory 252, a communication section 253, a USB interface 254, an internal bus 256, a communication control section 257, a device control section 258, a definition file 259, a trigger detection algorithm 260, and device information 261 is identical to the corresponding one of the CPU 201, the memory 202, the communication section 203, the USB interface 204, the internal bus 206, the communication control section 207, the device control section 208, the definition file 209, the trigger detection algorithm 210, and the device information 211.

As described above, according to the network device 250 of the present embodiment, through equipment of a trigger detection function equivalent to that of the device server 200 of the first embodiment, the network device 250 is not only capable of performing functions of its own as a device, e.g. similarly to a network printer, but also capable of monitoring a device 300 (e.g. a card reader) locally connected thereto, and upon detection of a state change of the device 300, transmitting the detected state change to the client PC 100 as a trigger notification.

Note that the present invention is not limited to the above-described embodiments, but it can be practiced in various forms, without departing from the spirit and scope thereof.

Although in the above, a definition file 115 and a trigger detection algorithm 116 received from the client PC 100 are stored (installed) as a definition file 209 and a trigger detection algorithm 210 in the device server 200 or the network device 250 (hereinafter both collectively represented by "the device server 200"), the definition file 115 and the trigger detection algorithm 116 may be acquired from a portable storage medium connected via the USB interface 204 and be stored in the device control section 208. Alternatively, a management server for managing the whole system may be additionally provided such that the definition file 115 and the trigger detection algorithm 116 are acquired from the management server via the network and are stored in the device control section 208.

Further, if a device 300 of the same model as that of a device which has been connected before is connected to the device server 200 and a definition file 209 and a trigger detection algorithm 210 associated with the model have already been stored (installed) in the device server 200, the device server 200 is not required to store the definition file 115 and the trigger detection algorithm 116 received from the client PC 100. Moreover, the device server 200 may notify the client PC 100 that it is not necessary to transmit the definition file 115 and the trigger detection algorithm 116.

Although in the step S1010 in FIG. 10, the trigger notification is sent to a single client PC 100, this is not limitative, but the trigger notification may be sent to a plurality of client PCs 100. In this case, the device server 200 can permit a first client PC 100 of plurality of client PCs 100, which has issued a connection request, to establish connection to the device 300. Alternatively, the device server 200 can perform control such that a predetermined number of client PCs 100 of all that have issued a connection request are permitted to establish connection to the device 300. Further, when a specific client PC 100 is incapable of receiving a trigger notification due to power-off or a failure, control may be performed such that the trigger notification can be sent to another client PC 100 as an alternative transmission destination.

In the above-described embodiments, the method (configuration) is described in which a definition file 115 and a trigger detection algorithm 116 associated with a device 300 are both stored in a client PC 100 and the device server 200 receives the definition file 115 and the trigger detection algorithm 116 from the client PC 100. However, the present invention can also employ the following methods (configurations):

(1) Necessary trigger detection algorithms 116 are stored (preloaded) in the device server 200 in advance, and only definition files 115 are stored in the client PC 100. In this case, the device server 200 receives from the client PC 100 only a definition file 115 associated with the model of a device 300 identified based on device information.

This configuration can be applied e.g. to a case where access to the device server 200 is limited e.g. due to dependency on the specifications and design of software and hardware or a reason related to the operation and management of the system, and hence it is impossible to receive and execute (or install) a trigger detection algorithm (program code). The present configuration is advantageous in that a trigger detection algorithm (program code) is stored in the device server in advance, which makes tampering difficult.

In this case, in the step S509 in FIG. 5, the client PC 100 does not determine whether or not the external storage section 106 stores trigger detection algorithms 116, but determines only whether or not the external storage section 106 stores definition files 115. Then, only an associated definition file 115 is sent to the device server 200. In other words, the packet which does not contain the item "trigger detection algorithm 116" in FIG. 6 is transmitted. On the other hand, the device server 200 having received this packet stores only the definition file 115 as a definition file 209 in the device control section 208 in the step S906 in FIG. 9.

(2) The device control system may be configured such that only when a trigger detection algorithm or a definition file associated with the model of an identified device 300 is not stored in the device server 200, the device server 200 acquires the necessary trigger detection algorithm or the necessary definition file e.g. from the client PC 100.

Further, the device server 200 or the client PC 100 may manage trigger detection algorithms and definition files and determine whether or not it is required to add or update a trigger detection algorithm or a definition file. With this configuration, the device server 200 can acquire all or part of the trigger detection algorithms and the definition files only when addition or update is required.

Moreover, the device control system may be configured such that the device server 200 accesses to the client PC 100 to download (acquire) a trigger detection algorithm and/or a definition file instead of receiving the same from the client PC 100 as in the above-described embodiments. In this case, the client PC 100 is only required to notify the device server 200 that the client PC 100 stores the associated trigger detection algorithm and/or definition file.

It is also possible to associate a plurality of definition files with one of the above-described trigger detection algorithms to thereby control a plurality of devices 300 in a manner associated with each other. For example, in a case where a device A and a device B are controlled in a manner associated with each other, control can be performed such that after trigger notifications have been received from both of the two devices, the operation of the device A is started.

Note that the present invention can also be applied to a case where a plurality of devices 300 different in model are connected to the device server 200. In this case, the device server 200 stores definition files and trigger detection algorithms (a plurality of pairs) associated with the respective devices on a model-by-model basis. Then, a trigger detection process is executed based on each combination of a trigger detection algorithm and a definition file appropriate to each of the devices, whereby state changes of the respective devices can be detected.

It is to be understood that the object of the present invention may also be accomplished by supplying a system or an apparatus with a storage medium in which a program code of software, which realizes the functions of either of the above-described embodiments, is stored, and causing a computer (or CPU or MPU) of the system or apparatus to read out and execute the program code stored in the storage medium.

In this case, the program code itself read from the storage medium realizes the functions of either of the above-described embodiments, and therefore the computer-readable storage medium in which the program code is stored constitutes the present invention.

Further, the functions of either of the above-described embodiments may also be accomplished by causing an OS (operating system) or the like which operates on the computer to perform a part or all of the actual operations based on instructions of the program code.

Moreover, the functions of either of the above-described embodiments may be accomplished by writing a program code read out from the storage medium into a memory provided on an expansion board inserted into a computer or a memory provided in an expansion unit connected to the computer and then causing a CPU or the like provided in the expansion board or the expansion unit to perform a part or all of the actual operations based on instructions of the program code.

Examples of the storage medium for supplying the program code include a floppy (registered trademark) disk, a hard disk, a magnetic-optical disk, an optical disk, such as a CD or a DVD, a magnetic tape, a nonvolatile memory card, and a ROM. Alternatively, the program code may be downloaded via a network.

REFERENCE SIGNS LIST 100 (100A, 100B) client PC
101 CPU
102 input section
103 display section
104 memory
105 communication section
106 external storage section
107 internal bus
108 OS
109 application program
110 resident module
111 device driver
112 USB class driver
113 USB virtual bus device
114 communication control section
115 definition file
116 trigger detection algorithm
200 (200A, 200B) device server
201 CPU
202 memory
203 communication section
204 USB interface
205 external storage section
206 internal bus
207 communication control section
208 device control section
209 definition file
210 trigger detection algorithm
211 device information
250 network device
251 CPU
252 memory
253 communication section
254 USB interface
255 external storage section
256 internal bus
257 communication control section
258 device control section
259 definition file
260 trigger detection algorithm
261 device information
262 device functional section
300 (300A, 300B) DEVICE
400 connection cable
500 network

The invention claimed is:

1. A device control apparatus connected to a client apparatus via a network and to which a device is to be locally connected, the device control apparatus comprising:
a processor configured to execute:
a device information acquisition task that acquires device information for identifying a device locally connected to the device control apparatus;
a monitoring information acquisition task that starts a first session with the client apparatus on the network and acquires, using the first session, at least one of a trigger detection algorithm and a definition file for monitoring a state change of a device identified based on the device information acquired by said device information acquisition task, according to the device information;
a monitoring information storage task that stores the at least one of the trigger detection algorithm and the definition file acquired by said monitoring information acquisition, wherein, when the at least one of the trigger detection algorithm and the definition file is stored, the first session is disconnected;
a device monitoring task that monitors the locally connected device based on the at least one of the trigger detection algorithm and the definition file stored in said monitoring information storage task, wherein the definition file is a data file storing information necessary for the trigger detection algorithm, and wherein the trigger detection algorithm is a program code describing an execution procedure monitoring the state of the device;
a trigger notification transmission task that is operable when a state change of the device is detected by said device monitoring task, to transmit a trigger notification indicative of the detection of the state change to the client apparatus via the network; and
a session control task that starts a second session with the client apparatus on the network in response to a connection request from a driver software component of the client apparatus having received the trigger notification, wherein the second session performs an occupied communication that the client apparatus temporarily occupies the device locally connected to the device control apparatus,
wherein the driver software components of the client apparatus is configured to send, in response to the notified trigger notification, the connection request to start the second session, and
wherein, in response to a determination of a completion of transmission/reception of data which includes information uniquely identifying the device, through the occupied communication, the second session is disconnected by the client apparatus.

2. The device control apparatus according to claim 1, wherein when connection of the device is detected, said device information acquisition task acquires the device information from the detected device.

3. The device control apparatus according to claim 1, further comprising a communication control task that performs protocol conversion between a first data format packet transmitted or received to or from the client apparatus and a second data format packet transmitted or received to or from the device, to thereby relay data transmission/reception between the client apparatus and the device.

4. The device control apparatus according to claim 1, wherein the second session is started to perform a virtualization control, and
wherein, by the virtualization control, the client apparatus communicates with the device so that the device as if the device were directly connected the client apparatus.

5. A client apparatus connected, via a network, to a device control apparatus to which a device is to be locally connected, comprising:
a processor configured to execute:
a device information acquisition task that acquires, from the device control apparatus, device information on the device which is locally connected to the device control apparatus;
a device identification task that identifies a device based on the acquired device information by the device information acquisition task;
a driver software components generation task that identifies driver software components required for transmission/reception of data with the device, based on the received device information by said device information acquisition task, and generates the driver software components, based on information concerning the identified device, the driver software components being comprised of a device driver, a USB class driver, and a USB virtual bus device;
a monitoring information storage task that stores at least either of one or more trigger detection algorithms and one or more definition files for monitoring a state change of the device, wherein the definition file is a data file storing information necessary for the trigger detection algorithm, and wherein the trigger detection algorithm is program code describing an execution procedure monitoring the state of the device;
a monitoring information identification task that identifies at least one of a trigger detection algorithm and a definition file appropriate to a device identified based on the device information acquired by said device information acquisition task, from the at least either of the trigger detection algorithms and the definition files stored in said monitoring information storage task;
a monitoring information transmission task that starts a first session with device control apparatus on the network and transmits, using the first session, the at least one of the trigger detection algorithm and the definition file identified by said monitoring information identification task to the device control apparatus, wherein, when the at least one of the trigger detection algorithm and the definition file is transmitted, the first session is disconnected;
a trigger notification reception task that receives a trigger notification indicative of detection of a state change of the device according to the transmitted at least one of the trigger detection algorithm and the definition file, from the device control apparatus having detected the state change of the device; and
a session control task that starts a second session with the device control apparatus on the network, when the driver software components sends a connection request in response to the trigger notification received by said trigger notification reception task, wherein the second session performs an occupied communication that the client apparatus temporarily occupies the device locally connected to the device control apparatus, and wherein, in response to a determination of a completion of transmission/reception of data which includes information uniquely identifying the device, through the occupied communication, the second session is disconnected.

6. The client apparatus according to claim 5, wherein the virtualization control task further performs protocol conversion between a first data format packet transmitted or received to or from the device control apparatus and a second data format packet transmitted or received to or from the driver software component.

7. The client apparatus according to claim 5, wherein the second session is started to perform a virtualization control, and
wherein, by the virtualization control, the client apparatus communicates with the device so that the device as if the device were directly connected the client apparatus.

8. A device control method executed by a device control apparatus connected to a client apparatus via a network and to which a device is to be locally connected, the device control method comprising:
a device information acquisition step of starting a first session with the client apparatus on the network and acquiring, using the first session, device information for identifying a device locally connected to the device control apparatus;
a monitoring information acquisition step of acquiring at least one of a trigger detection algorithm and a definition file for monitoring a state change of a device identified based on the device information acquired in said device information acquisition step, according to the device information;
a monitoring information storage step of storing the at least one of the trigger detection algorithm and the definition file acquired in said monitoring information acquisition step, wherein, when the at least one of the trigger detection algorithm and the definition file is stored, the first session is disconnected;
a device monitoring step of monitoring the locally connected device based on the at least one of the trigger detection algorithm and the definition file stored in said monitoring information storage step, wherein the definition file is a data file storing information necessary for the trigger detection algorithm, and wherein the trigger detection algorithm is a program code describing an execution procedure monitoring the state of the device;
a trigger notification transmission step of transmitting, when a state change of the device is detected in said device monitoring step, a trigger notification indicative of the detection of the state change to the client apparatus via the network; and a session control step of starting a second session with the client apparatus on the network in response to a connection request from a driver software component of the client apparatus having received the trigger notification, wherein the second session performs an occupied communication that the client apparatus temporarily occupies the device locally connected to the device control apparatus, wherein the driver software components of the client apparatus is configured to send, in response to the notified trigger notification, the connection request to start the second session, and wherein in response to a determination of a completion of transmission/reception of data which includes information uniquely identifying the device, through the occupied communication, the second session is disconnected by the client apparatus.

9. The device control method according to claim 8, wherein in said device information acquisition step, when connection of the device is detected, the device information is acquired from the detected device.

10. The device control method according to claim 8, further comprising a communication control step of performing protocol conversion between a first data format packet transmitted or received to or from the client apparatus and a second data format packet transmitted or received to or from the device, to thereby relay data transmission/reception between the client apparatus and the device.

11. The device control method according to claim 8, wherein the second session is started to perform a virtualization control, and wherein, by the virtualization control, the client apparatus communicates with the device so that the device as if the device were directly connected the client apparatus.

12. A device control method executed by a client apparatus connected, via a network, to device control apparatuses to which a device is to be locally connected, comprising:

a device information acquisition step of acquiring, from the device control apparatus, device information on the device which is locally connected to the device control apparatus;

a device identification step of identifying a device based on the acquired device information by the device information acquisition step;

a driver software components generation step of identifying driver software components required for transmission/reception of data with the device, based on the received device information by said device information acquisition step, and generating the driver software components, based on information concerning the identified device, the driver software components being comprised of a device driver, a USB class driver, and a USB virtual bus device;

a virtualization control step of virtually controlling the device as if the device were directly connected to the client apparatus by the generated driver software components;

a monitoring information storage step of storing at least either of one or more trigger detection algorithms and one or more definition files for monitoring a state change of the device, wherein the definition file is a data file storing information necessary for the trigger detection algorithm, and wherein the trigger detection algorithm is program code describing an execution procedure monitoring the state of the device;

a monitoring information identification step of identifying at least one of a trigger detection algorithm and a definition file appropriate to a device identified based on the device information acquired in said device information acquisition step, from the at least either of the trigger detection algorithms and the definition files stored in said monitoring information storage step;

a monitoring information transmission step of starting a first session with device control apparatus on the network and transmitting, using the first session, the at least one of the trigger detection algorithm and the definition file identified in said monitoring information identification step to the device control apparatus, wherein, when the at least one of the trigger detection algorithm and the definition file is transmitted, the first session is disconnected;

a trigger notification reception step of receiving a trigger notification indicative of detection of a state change of the device according to the transmitted at least one of the trigger detection algorithm and the definition file, from the device control apparatus having detected the state change of the device; and a session control step of starting a second session with the device control apparatus on the network, when the driver software components sends a connection request in response to the trigger notification received in said trigger notification reception step, wherein the second session performs an occupied communication that the client apparatus temporarily occupies the device locally connected to the device control apparatus and wherein, in a response to a determination of a completion of transmission/reception of data which includes information uniquely identifying the device, through the occupied communication, the second session is disconnected.

13. The device control method according to claim 12, wherein the virtualization control step further performs protocol conversion between a first data format packet transmitted or received to or from the device control apparatus and a second data format packet transmitted or received to or from the driver software components.

14. The device control method according to claim 12, wherein the second session is started to perform a virtualization control, and wherein, by the virtualization control, the client apparatus communicates with the device so that the device as if the device were directly connected the client apparatus.

15. A device control system including a device control apparatus and a client apparatus connected to each other via a network and configured such that a device is to be locally connected to the device control apparatus, wherein the device control apparatus virtually controls the client apparatus and the device as if they were directly connected to each other via the device control apparatus, wherein the device control apparatus comprises:

a first processor configured to execute:

a device information acquisition task that acquires device information for identifying a device locally connected to the device control apparatus;

a monitoring information acquisition task that starts a first session with the client apparatus on the network and acquires, using the first session, at least one of a trigger detection algorithm and a definition file for monitoring a state change of a device identified based on the device information acquired by said device information acquisition task, according to the device information;

a first monitoring information storage task that stores the at least one of the trigger detection algorithm and the definition file acquired by said monitoring information acquisition task, wherein, when the at least one of the trigger detection algorithm and the definition file is stored, the first session is disconnected;

a device monitoring task that monitors the locally connected device based on the at least one of the trigger detection algorithm and the definition file stored in said first monitoring information storage task, wherein the definition file is a data file storing information necessary for the trigger detection algorithm, and wherein the trigger detection algorithm is a program code describing an execution procedure monitoring the state of the device;

a trigger notification transmission task that is operable when a state change of the device is detected by said device monitoring task, to transmit a trigger notification indicative of the detection of the state change to the client apparatus via the network; and a session control task that starts a second session with the client apparatus on the network in response to a connection request from a driver software component of the client apparatus having received the trigger notification, wherein the second session performs an occupied communication that the client apparatus temporarily occupies the device locally connected to the device control apparatus, wherein the driver software components of the client apparatus is configured to send, in response to the notified trigger notification, the connection request to start the second session, and wherein in response to a determination of a completion of transmission/reception of data which includes information uniquely identifying the device, through the occupied communication, the second session is disconnected by the client apparatus, and wherein the client apparatus comprises:

a second processor configured to execute:

a virtualization control task that virtually controls the device as if the device were directly connected to the client apparatus by the generated driver software components;

a device information acquisition task that acquires, from the device control apparatus, device information on the device which is locally connected to the device control apparatus;

a device identification task that identifies a device based on the acquired device information by the device information acquisition task;

a driver software components generation task that identifies driver software components required for the transmission/reception of data with the device, based on the received device information by said device information acquisition task, and generates the driver software components, based on information concerning the identified device, the driver software components being comprised of a device driver, a USB class driver, and a USB virtual bus device;

a second monitoring information task that stores at least either of one or more trigger detection algorithms and one or more definition files for monitoring a state change of the device, wherein the definition file is a data file storing information necessary for the trigger detection algorithm, and wherein the trigger detection algorithm is a program code describing an execution procedure monitoring the state of the device;

a monitoring information identification task that identifies at least one of a trigger detection algorithm and a definition file appropriate to a device identified based on the device information acquired by said device information acquisition task, from the at least either of the trigger detection algorithms and the definition files stored in said second monitoring information storage task;

a monitoring information transmission task that starts a first session with device control apparatus on the network and transmits, using the first session, the at least one of the trigger detection algorithm and the definition file identified by said monitoring information identification task to the device control apparatus, wherein, when the at least one of the trigger detection algorithm and the definition file is transmitted, the first session is disconnected;

a trigger notification reception task that receives a trigger notification indicative of detection of a state change of the device, according to the transmitted at least one of the trigger detection algorithm and the definition file from the device control apparatus having detected the state change of the device; and a session control task that starts a second session with the device control apparatus on the network, when the driver software components sends a connection request in response to the trigger notification received by said trigger notification reception task, wherein the second session performs an occupied communication that the client apparatus temporarily occupies the device locally connected to the device control apparatus, and wherein, in response to a determination of a completion of transmission/reception of data which includes information uniquely identifying the device, through the occupied communication, the second session is disconnected.

16. The device control system according to claim 15, further comprising a communication control task of the device control apparatus that performs protocol conversion between a first data format packet transmitted or received to or from the client apparatus and a second data format packet transmitted or received to or from the device, to thereby relay data transmission/reception between the client apparatus and the device, and wherein the virtualization control task of the client apparatus further performs protocol conversion between a first data format packet transmitted or received to or from the device control apparatus and a second data format packet transmitted or received to or from the driver software components.

17. The device control system according to claim 15, wherein the second session is started to perform a virtualization control, and wherein, by the virtualization control, the client apparatus communicates with the device so that the device as if the device were directly connected the client apparatus.

* * * * *